Nov. 7, 1939.   M. L. ECKMAN   2,179,326
WELDING APPARATUS
Filed July 5, 1938

INVENTOR.
MERIL L. ECKMAN
BY Bates, Goldrick, & Teare
ATTORNEYS

Patented Nov. 7, 1939

2,179,326

UNITED STATES PATENT OFFICE 2,179,326

WELDING APPARATUS

Meril L. Eckman, Cleveland, Ohio, assignor to The American Coach & Body Company, Cleveland, Ohio, a corporation of Ohio Application July 5, 1938, Serial No. 217,375

6 Claims. (Cl. 219—4)

This invention relates to welding apparatus and particularly to that type which includes long flexible conductors with electrodes positioned at the ends thereof so that they may be transported to the work.

One of the difficulties experienced in using a portable electrode is the fact that the operator may not know precisely when he is exerting adequate pressure of the electrode against the work to make a satisfactory weld. This pressure must vary with the gauge of the metal to be welded and hence considerable skill is required to produce satisfactory results.

An object of the present invention is to provide a device which automatically requires the application of a predetermined pressure between the electrode and work before current can flow therethrough. Additionally, the invention includes a device which may be calibrated for metals of different thickness so that the operator may be table to control the pressure exerted to suit any gauge of metal to be welded.

Figure 1:
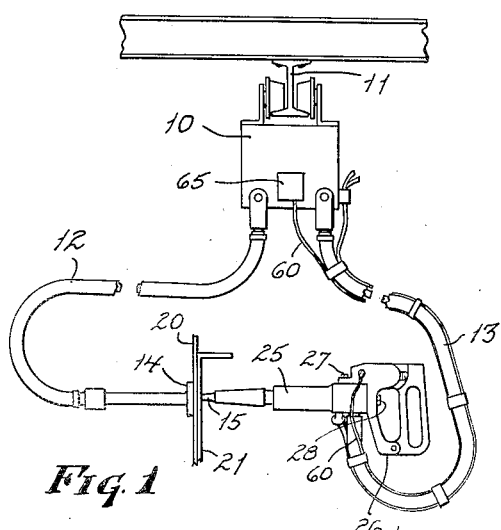
Figure 6:
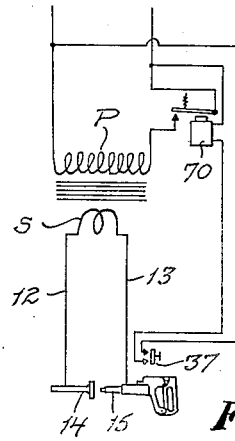
Figure 3:
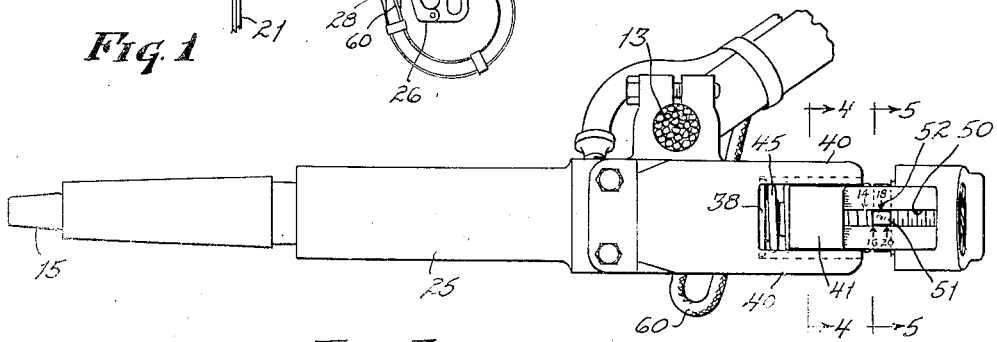
Figure 2:
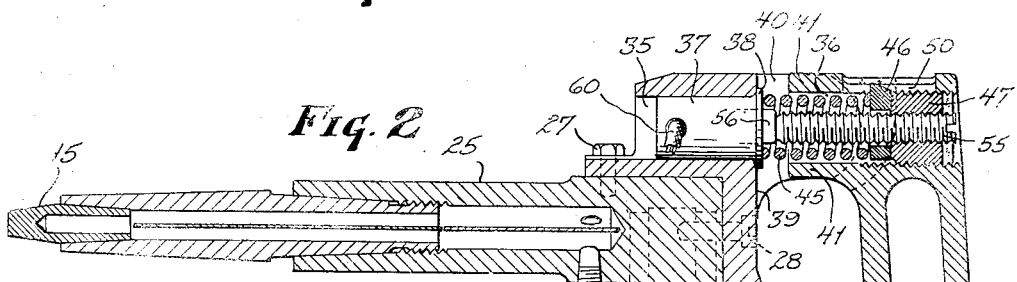
Figures 4, 5:
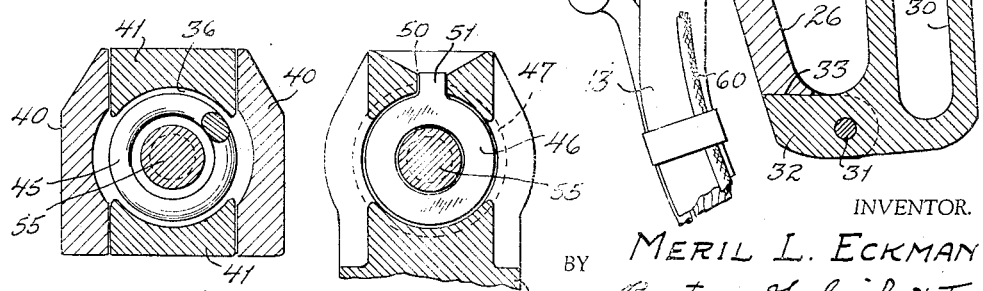

Referring now to the drawing, Fig. 1 illustrates a welding device embodying my invention; Fig. 2 is a longitudinal section taken through the welding gun; Fig. 3 is a top plan view of the gun shown in Figs. 1 and 2; Figs. 4 and 5 are sections taken on the correspondingly numbered lines in Fig. 3, and Fig. 6 is a wiring diagram.

A welding apparatus with which my invention is illustrated comprises a transformer 10 which is suitably mounted on an overhead trackway 11 and which is provided with flexible conductors 12 and 13, to the ends of which are connected electrodes 14 and 15 respectively. In this illustration, the plates to be welded together are indicated at 20 and 21 respectively. In practice, the electrode 14 is either clamped or held by an operator against the plate 20 while the electrode 15 is pressed by another operator against the plate 21. To control the pressure between the electrode 15 and the plate 21, I have shown the electrode as being attached to a carrier or gun 25 which is provided with a handle 26 that may be attached thereto by suitable fastening members 27 and 28. The handle comprises a relatively stationary portion that is fastened, as heretofore stated, to the electrode carrier, and a movable portion 30 which is pivoted to the stationary portion 31. The movable portion comprises a hand grip against which pressure is exerted, both for pressing the electrode against the work, and for causing a welding current to flow therethrough.

In the preferred arrangement, the stationary part of the handle is bifurcated to receive a tongue 32 which forms an extension of the grip portion 30 and the tongue is adapted to engage a shoulder 33 on the stationary part so as to limit outward movement of the grip portion with respect to the stationary portion. The upper ends of the stationary and movable portions are provided with registering apertures 35 and 36 respectively. A self contained push button switch 37 is positioned within the aperture 35 and is provided with a stop in the form of a flange 38 which abuts against a wall 39 on the stationary part of the handle. The stationary part, as shown in Figs. 3 and 4, has arms 40 extending toward the grip portion and providing a guideway for arm 41 which forms part of the grip and which extends toward the stationary portion. A spring 45 is disposed within the passageway 36 and bears at one end against the flange 38 and at the other end against a washer 46 which in turn seats against an adjusting nut 47 by means of which tension of the spring may be varied. The purpose of adjusting the tension on the spring is to vary the pressure which must be exerted upon the grip portion in order to actuate the push button controller 37. The extent of the spring movement can be observed through an opening 50 in the top of the grip portion through which a tongue 51 on the washer 46 extends. Suitable markings 52 adjacent the openings may be calibrated to indicate the gauge of metal that is to be welded.

To actuate the controller by movement of the hand grip, I have shown a threaded spindle 55 which extends through a correspondingly threaded passageway in the adjusting nut 47 and which is adapted to bear against the push button plunger 56. The spindle may be adjustably positioned within the nut 47 in order to compensate for any variation in size of the push button mechanism. Current may be conducted to the push button through a conductor 60 which may extend along the cable 13 and be connected to a relay 65 which is illustrated in Fig. 1 as being attached to the transformer casing.

Normally the spring 45 urges the two parts of the handle away from each other, but such movement is limited by contact between the tongue 32 and the shoulder 33. When the gun is to be used, however, the adjusting screw 47 is manipulated until the tongue 51 corresponds to the markings 52 which represent the gauge of the metal to be welded. Thereupon, the operator places the electrode against the work and pushes against the hand grip. Pressure is exerted until the tension of the spring 45 is overcome and the push button plunger 56 is depressed to close the circuit through the control mechanism that initiates the flow of current through the electrode. It is to be understood that the apparatus is to be provided with suitable timing equipment which automatically limits the time during which the current is allowed to flow, this interval being, of course, predetermined and fixed in accordance with the characteristics of the apparatus and current utilized. It is sufficient to state that the operator need only press the electrode against the work and that the flow of current starts automatically and in the correct amount to produce a satisfactory weld.

In Fig. 6, I have shown a wiring diagram wherein the primary of the transformer is indicated at P and the secondary at S. Conductors 12 and 13 from the secondary lead to the electrodes 14 and 15 while the control mechanism for causing the flow of current is connected to the primary circuit. In the form illustrated, the control comprises a relay 70 which is governed by the push button mechanism.

From the foregoing description, it is apparent that my invention provides a mechanism that is contained within the electrode handle for automatically obtaining the required degree of pressure for any given thickness of metal to be welded, and that the pressure setting may be adjusted readily to suit any particular gauge desired. A further advantage of my invention is the fact that the arrangement enables an operator to exert pressure by a direct push against the handle thereby enabling him to accomplish the desired result without undue fatigue.

I claim:

1. In a welding apparatus, the combination of an electrode carrier having a handle comprising relatively stationary and relatively movable members, said members being pivotally connected and having registering openings, a push button controller in one of the openings and means in the other opening for engaging and actuating the controller, said means including a spring and an adjusting nut for fixedly constraining the spring at various positions by means of which the pressure required to actuate the controller may be varied at the will of the operator.

2. In combination, an electrode carrier having a handle comprising a relatively stationary portion and a relatively movable portion, the two portions being pivotally interconnected, one of said portions having a push button switch carried thereby and the other of said portions having an actuator for said switch, the actuator including a compression spring and an adjusting nut for fixedly constraining the spring at various positions by means of which the extent of the pressure required for actuating the switch may be varied to suit the conditions under which the electrode is to be used.

3. In combination, an electrode carrier having a handle, said handle comprising a relatively stationary and a relatively movable member, a push button switch carried by one of the members, and means for actuating the switch carried by the other member, said means including a spring, an adjusting nut for constraining the spring at increasing values of pressure, and a member extending through the adjusting screw and in threaded engagement therewith and adapted to bear against the switch, for actuating the same upon movement of one of the members with reference to the other.

4. A handle for an electrode carrier comprising two relatively movable members having registering openings extending therethrough, a push button controller in one of the openings and an actuator for said controller in the other opening, said actuator including a spring, means to apply a fixed load on the spring and an indicator that is actuated thereby for indicating the load on the spring.

5. An electrode carrier having a handle therefor, the handle including a grip portion that is pivoted for movement with respect to the carrier, said grip portion having an opening extending therethrough, a spring and an adjusting nut located within the opening to constrain the spring at increasing values of pressure, the wall of the opening having a slot therein, a washer interposed between the spring and adjusting nut, and having a tongue extending through the slot, and a scale on the grip portion adjacent the slot, a threaded spindle extending through the adjusting nut and adjustable independently of the nut and a circuit controller adapted to be engaged by the spindle upon movement of the grip portion with reference to the carrier.

6. A welding apparatus comprising an electrode carrier in the form of a barrel having an electrode at one end thereof, a handle in the form of a hand grip pivotally connected to the other end of the carrier and extending transversely of the axis thereof, whereby said hand grip may furnish means for directly shoving on the carrier in a direction of its length and without external anchorage to hold the electrode against the work, an electric switch actuated by the movement of the handle toward the carrier, and a spring resisting such movement.

MERIL L. ECKMAN.